United States Patent
Davies et al.

(10) Patent No.: US 8,699,300 B2
(45) Date of Patent: Apr. 15, 2014

(54) UNDERWATER COMMUNICATIONS

(75) Inventors: Jonathan James Davies, Livingston (GB); Shaun Michael Dunn, Sherbourne (GB)

(73) Assignee: Atlas Electronik UK Limited, Newport, SW (GB)

( * ) Notice: Subject to any disclaimer, the term of this patent is extended or adjusted under 35 U.S.C. 154(b) by 796 days.

(21) Appl. No.: 12/675,668

(22) PCT Filed: Aug. 26, 2008
(Under 37 CFR 1.47)

(86) PCT No.: PCT/GB2008/002848
§ 371 (c)(1),
(2), (4) Date: Dec. 9, 2010

(87) PCT Pub. No.: WO2009/027639
PCT Pub. Date: Mar. 5, 2009

(65) Prior Publication Data
US 2011/0128822 A1 Jun. 2, 2011

(30) Foreign Application Priority Data

Aug. 31, 2007 (GB) .................................. 0716918.8

(51) Int. Cl.
*H04B 11/00* (2006.01)
(52) U.S. Cl.
USPC ........................................................ 367/134
(58) Field of Classification Search
USPC .................................................. 367/134–190
See application file for complete search history.

(56) References Cited

U.S. PATENT DOCUMENTS

| 3,979,712 | A | 9/1976 | Ettenhofer et al. |
| 5,321,668 | A | 6/1994 | Rouquette |
| 6,272,072 | B1 * | 8/2001 | Wulich et al. ................. 367/124 |
| 6,512,720 | B1 | 1/2003 | Yang |
| 2004/0012500 | A1 | 1/2004 | Hahn et al. |

FOREIGN PATENT DOCUMENTS

| DE | 102005040203 | | 1/2007 | |
| DE | 102005040203 | * | 4/2007 | ............ H04B 11/00 |
| GB | 2281424 | | 3/1995 | |
| GB | 2386233 | | 9/2003 | |
| WO | 02082695 | | 10/2002 | |
| WO | 2004/013997 | | 2/2004 | |
| WO | 2007/095103 | | 8/2007 | |
| WO | 2004027444 | | 2/2010 | |

OTHER PUBLICATIONS

International Search Report for PCT/GB2008/002848.

* cited by examiner

*Primary Examiner* — Luke Ratcliffe
(74) *Attorney, Agent, or Firm* — McDonnell Boehnen Hulbert & Berghoff LLP

(57) ABSTRACT

A method of underwater communication between a link initiator and a link receptor, by transmitting a link acquisition waveform from the initiator to the receptor, and establishing communications channel parameters from such a received waveform. Data is then transmitted according to these parameters, which may include range, direction, frequency band and Doppler, with greater efficiency and robustness.

15 Claims, 7 Drawing Sheets

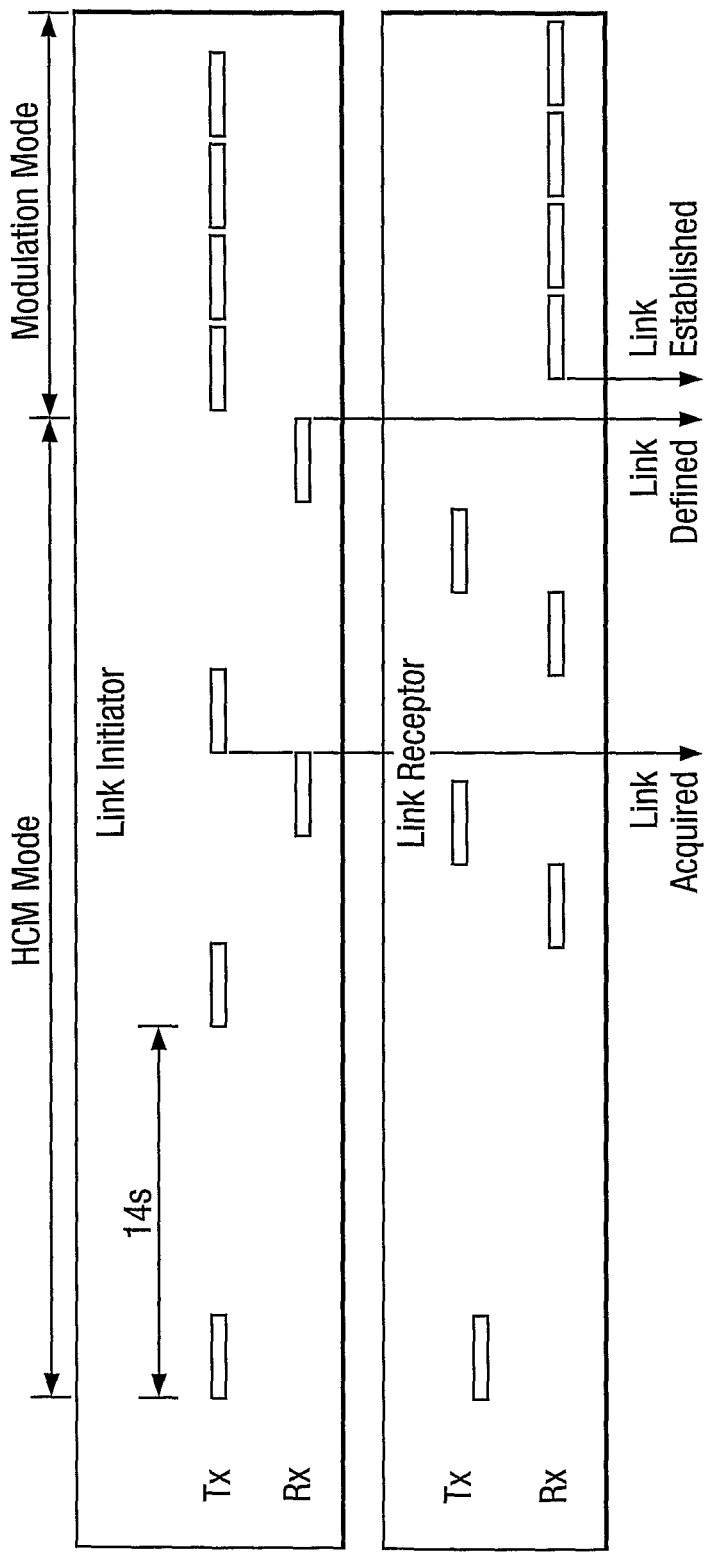

Plan view

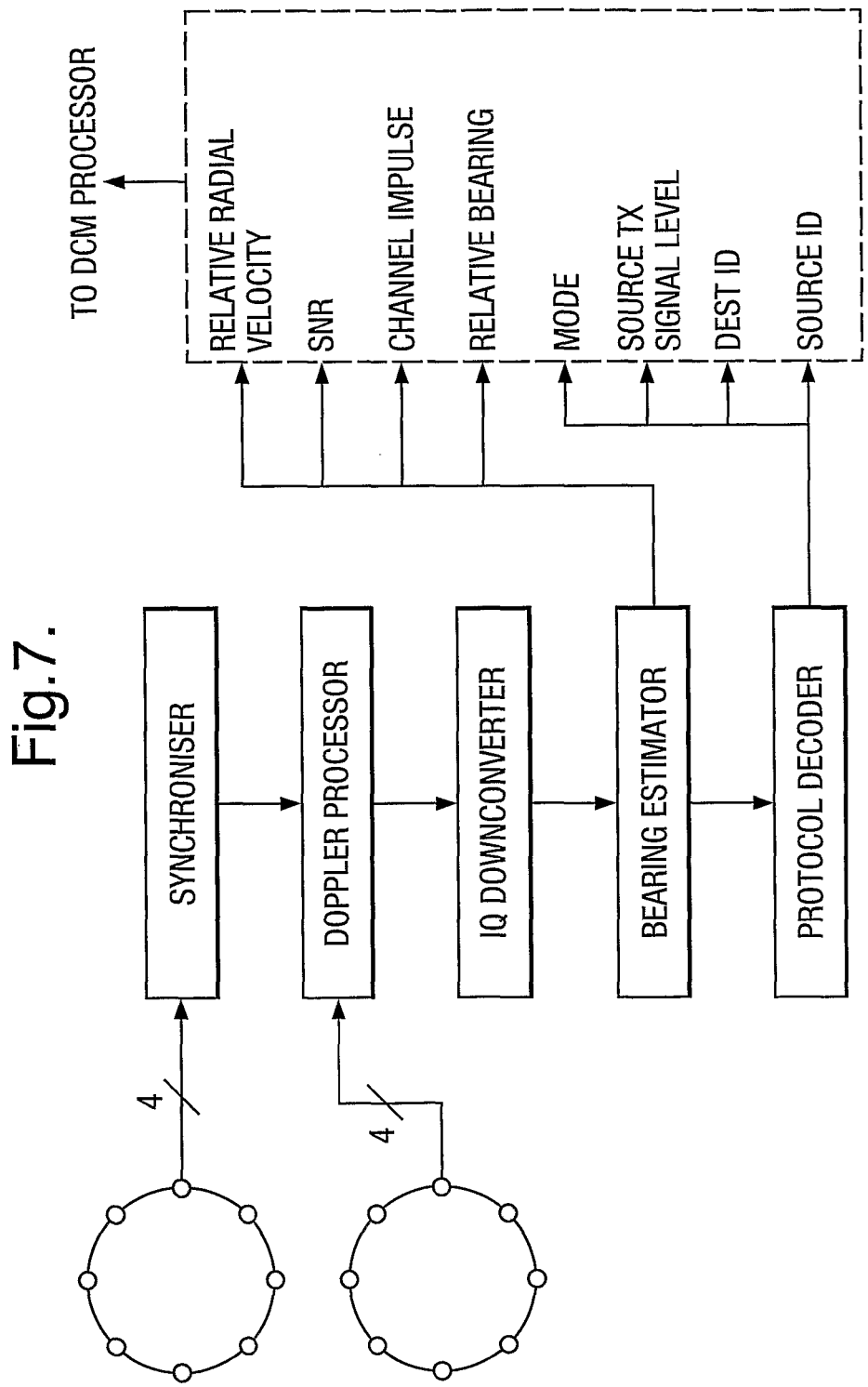

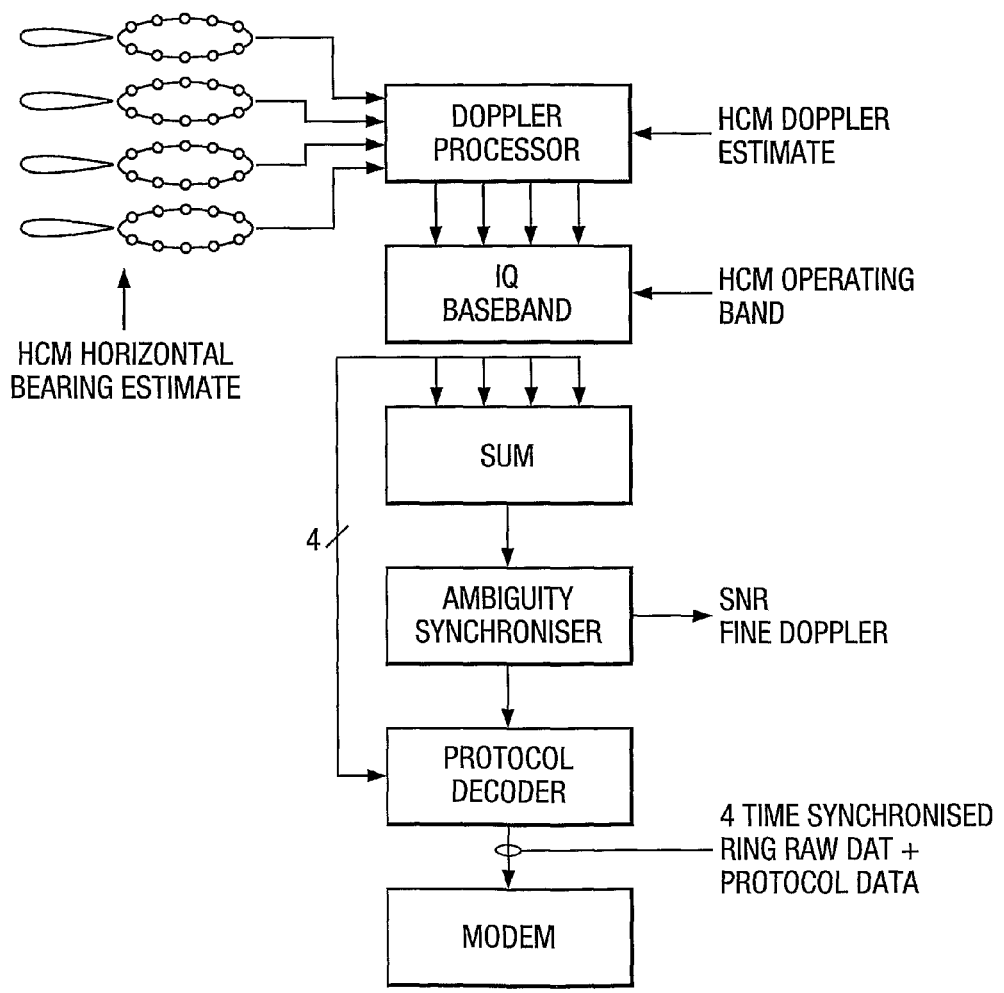

UNDERWATER COMMUNICATIONS

The present invention relates to methods of underwater communication, and particularly, but not exclusively, to acoustic communication between submerged platforms such as underwater vehicles and seabed sensors and manned assets. The invention finds particular application in the oil and gas offshore exploration industry.

Reliable communication at depth represents a significant technical problem. Whilst it is feasible to penetrate the ocean depths using low frequency EM transmission, as demonstrated by the extremely complex infrastructures in place for military submarine communications, there is no current solution to the problem of high data rate communications, over reasonable range, to submerged platforms using EM technology.

Very low frequencies (VLF) EM technology can only penetrate to a few tens of metres. Extra low frequency (ELF) EM technology can potentially, penetrate several hundreds of metres, however in addition to the disadvantage of low data rate, these links are one way only, the infrastructures extremely expensive to install and maintain and the technology not without environmental concerns.

EM signals experience large attenuation as they propagate through water. At low frequencies these losses, although high compared to acoustic signal losses, enable ELF and VLF transmissions to be received by submerged platforms under the water surface. At higher medium frequencies (MF) through to very high frequencies (VHF) and beyond, the attenuation losses become extremely high making EM based telemetry impractical for all but the most limited of applications.

If one considers the propagation of acoustic waves within the ocean medium, the losses are orders of magnitude smaller. At frequencies below 1 kHz absorption losses are so small that acoustic signals can, under favourable conditions, propagate hundreds or even thousands of miles depending upon the transmission power level. Below 10 kHz the energy losses due to absorption are usually overtaken by other loss mechanisms such as those arising when the sound interacts with the ocean surface and sea floor.

The price paid for this greatly reduced absorption loss, is heavily weighted by the fundamentally different nature of acoustic propagation and the complexity of the ocean environment. These issues conspire to make acoustic communications quite unlike any terrestrial or extraterrestrial EM communication technology and many of the techniques established around these technologies, fail to work reliably in the harsh underwater environment.

The most obvious difference between electromagnetic and acoustic waves is the speed at which they propagate. In water, propagation speed is influenced by several factors including temperature, pressure and salinity. A typical benchmark figure representative of sea water is $1.5 \times 10^3$ m/s. EM propagation speed is also subject to environmental factors, however a typical figure is $3 \times 10^8$ m/s (in a vacuum and considerably slower in the sea).

The ratio of these two propagation speeds is approximately 200,000; a fact which underlines the significantly different nature of the two wave types. If one for example, transmits a radio signal comprising a single bit of information 0.001 s duration, this pulse of energy would occupy a physical length of 300 km as it propagates out into space. The same signal transmitted acoustically underwater will occupy a physical length of only 1.5 m. In air, where propagation speeds reduce even further, the pulse would occupy a physical space of only 30-40 cm.

It is perhaps not difficult to see then, that the physically smaller acoustic pulse is much more likely to be distorted as it propagates within a complex medium such as the ocean.

Phenomenon such as multipath transmission, whereby a signal adopts many distinct paths to reach its destination. resulting in several delayed versions of the transmitted signal, each arriving at a different time with varying levels of distortion, and Doppler are well known problems in the radio world and effective techniques have evolved to combat them. In the acoustic case, these problems are orders of magnitude more severe and it is perhaps not surprising that the evolution of acoustic communications technology has lagged somewhat behind RF technology. Changes in depth, temperature and salinity of water, not only influence the speed of sound propagation, but also influence the direction of sound propagation. Specifically, as sound propagates it is seen to 'bend' or refract as it encounters changes in propagation speed.

It is an object of the present invention to provide improved methods and apparatus for acoustic communication.

According to a first aspect of the invention therefore, there is provided a method of communicating data acoustically between a link initiator and a link receptor, said method comprising the steps of transmitting a link acquisition waveform, receiving receipt of a link acquisition waveform, establishing from said receipt communication channel parameters, and transmitting data along said communications channel according to said established parameters.

In this way a communication channel can be established, which minimises time to synchronisation, is robust and experiences reduced risk of interference with other channels.

In one embodiment the parameters includes at least one of range, direction, frequency band and Doppler, and preferably all of these parameters to achieve synchronisation in space, range and Doppler, and to establish the frequency band of communication.

Preferably the link acquisition waveform is transmitted omnidirectionally, and the link acquisition waveform is advantageously received by an array of hydrophones, preferably a ring array. In this way the Handshake Communication Mode (HCM) is an omni-directional transmit and receive mode. This mode is used to initiate and control the data link. The system can advantageously receive and make HCM transmissions at any time. Upon receipt of a valid HCM transmission, the receiver system is appropriately conditioned to receive subsequent data transmissions.

In suitable embodiments, data is received directionally according to the direction channel parameter by beamforming. In this way The Data Communication Mode (DCM) can be made a sector based receive, omni transmit mode. This mode is used to transmit and receive digital data. The system can receive DCM transmissions at any time however, for correct operation, DCM transmissions must be preceded by a valid HCM transmission. The system can make DCM transmissions at any time. The DCM operating band is conveniently controlled through HCM transmissions.

The acquisition waveform preferably defines the source level for the receipt, and is advantageously short—typically less than 1 second in duration. This allows the waveform to be kept short to minimise unnecessary detection by or interference with a third platform, whilst remaining capable of generating processing gain to counter environmental effects.

In certain embodiments, data transmission occurs in one of a plurality of preselected modes, and each data packet includes a header indicating the data mode for that packet The available modes or modulation schemes provide a compromise between data throughput and robustness and the underlying principles behind each modulation scheme are fundamentally different. An operator can select a modulation mode based on required data rate and/or robustness operating criteria, or alternatively automatic modulation mode selection can be provided.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention extends to methods and/or apparatus substantially as herein described with reference to the accompanying drawings.

Any feature in one aspect of the invention may be applied to other aspects of the invention, in any appropriate combination. In particular, method aspects may be applied to apparatus aspects, and vice versa.

Furthermore, features implemented in hardware may generally be implemented in software, and vice versa. Any reference to software and hardware features herein should be construed accordingly.

Preferred features of the present invention will now be described, purely by way of example, with reference to the accompanying drawings, in which:

FIG. 1 is a pictorial overview of a Handshake Communication Mode;

FIG. 7 illustrates HCM processing;

FIG. 8 Illustrates DCM processing.

An overview of the Handshake Communication Mode (HCM) is illustrated in FIG. 1. The HCM process will be automatic and used to initiate and define all communication links.

The link initiation process commences with selection of a PCM mode (voice, hdr, and three robust Idr modes) and an operating frequency. The operating frequency will typically be selected according to the particular data payload and the application, and in embodiments a low frequency is used initially followed by a higher frequency for greater throughput. The link initiator then transmits a link acquisition HCM waveform. Initially the HCM transmission is made at the lowest transmit source level. After transmitting a waveform the link initiator monitors the HCM receiver for a return transmission from the link receptor. If a return signal is not received after a predetermined period the source level is increased and a further transmission is made. The predetermined period is selected according to the minimum delay between transmissions. This may be a small number of seconds, or in the case of low frequency transmission over a long distance, upwards of one minute. This whole process is repeated until a valid response from the link receptor is received.

Upon receipt of the link acquisition waveform the link receptor responds by transmitting a link acquisition waveform as a handshake. The link receptor uses the encoded source level contained in the received signal to set the source level for this transmission. At this point the communication link is acquired. Having acquired the communications link, the link initiator transmits a link definition waveform at the selected operating frequency. The link definition waveform is similar in format to the link acquisition waveform but contains additional information, which describes the desired modulation mode (e.g. voice, hdr, or Idr,).

The link receptor handshakes by transmitting a link definition waveform back to the transmitter. The communications link is defined at this point. Data communication then takes place using the requested mode. The link receptor will use a time-out monitoring technique on the received data stream to ensure a timely return to HCM receive mode.

Figure 2A:
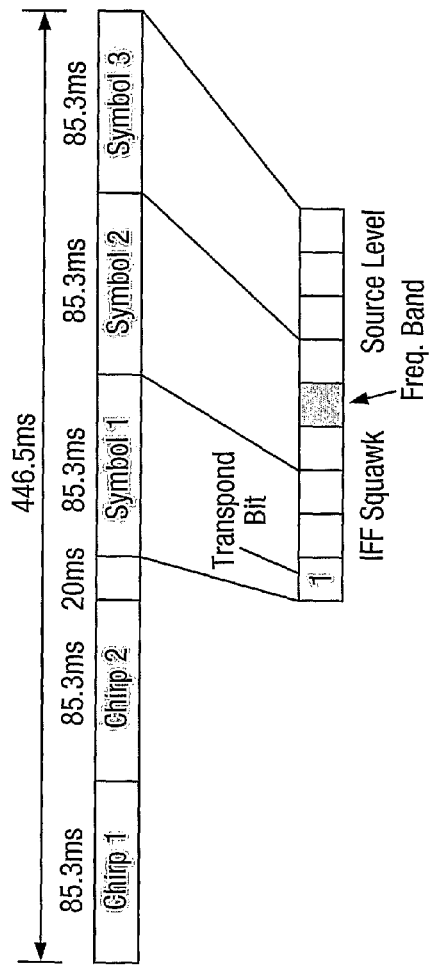
FIGS. 2a and 2b show HCM waveforms.

An exemplary waveform design for the HCM link acquisition waveform is now described with reference to FIG. 2a. The waveform presented in FIG. 2a is a Idr waveform, which generates approximately 27 dB of processing gain. It consists of two chirps followed by three Direct Sequence Spread Spectrum (DSSS) symbols. The two chirps enable a receiver quickly to calculate the relative velocity or Doppler ambiguity between link initiator and link receptor, as described more fully in WO02/082695 to which reference is directed.

Each chirp consists of an 8 KHz chirp. Each DSSS symbol is mapped to three bits and the corresponding bit map is shown in the lower half of FIG. 2a. Estimates of the channel transfer function are computed from the first DSSS symbols which is cyclically extended. In link acquisition mode the transpond bit is set which indicates to the receiver that only a further two symbols are to be decoded. The receiver automatically responds which allows the range ambiguity between transmitter and receiver to be calculated.

A single bit is used to indicate the frequency band to be used for the subsequent link definition and communication modes. An identifier relating to the transmitting vessel can be encoded in the 3 IFF squawk bits. The final four bits are used to encode the source level of the transmission. The source level bits allow the receiver to intelligently set the source level of the response transmission. A cyclic extension to the first M sequence of 20 ms duration is inserted between the chirps and the DSSS symbols.

Figure 2B:
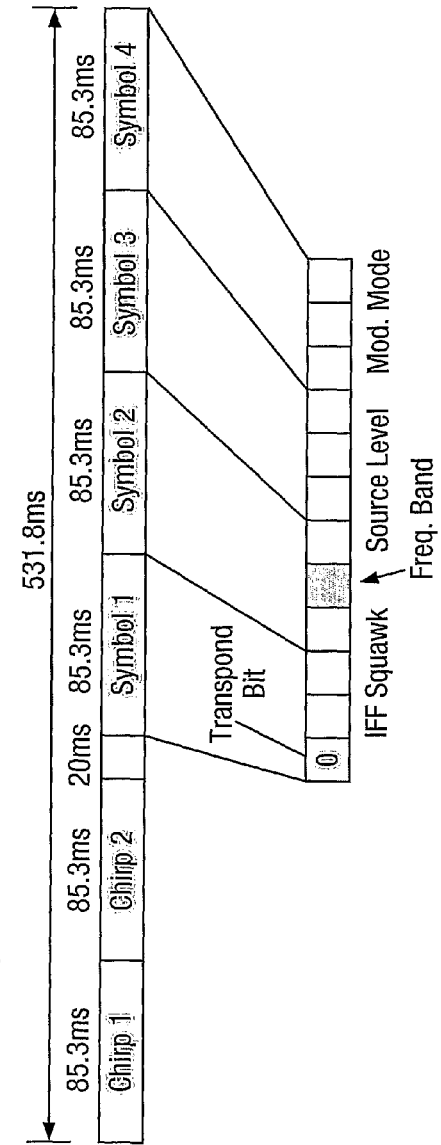

The link definition waveform will now be described with reference to FIG. 2b. This waveform is similar to the link acquisition waveform, but with an additional symbol as shown. The transpond bit is set to zero which indicates to the receiver that a further three symbols should be read. The extra symbol provides three additional bits to indicate the required communication and modulation modes.

In an alternative embodiment, a single HCM waveform including modulation mode information can be used to establish channel parameters. Again the signal starts with two chirps, but rather than a 20 ms cyclic extension, a further 83.5 ms channel estimation waveform is included to provide an estimate for the channel transfer function. Four symbols 85.3 ms symbols follow as before, but with the destination ID and the source ID hard coded into the first two symbols. The third and fourth symbols encode source level and frequency band as previously.

In such an embodiment a communication link is established as follows:

The transmitter transmits the HCM command. This command is encoded with source ID, destination ID, transmission source level and operating mode. The mode command defines a request for link and operating band. The receiver receives the HCM command. The receiver will decode the HCM transmission, verify source ID, destination ID, source level and operating mode. If valid, then the receiver will condition the DCM signal processing chain to operate at the required band and will adjust the receive beam to point at the transmitter. The receiver transmits an HCM command to acknowledge. The transmitter receives HCM acknowledge. Transmitter decodes the HCM transmission, verifies source ID, destination ID, source level and operating mode. If valid then the transmitter will condition the DCM signal processing chain to operate at the required band and will adjust the receive beam to point at the receiver. The transmitter and receiver may now communicate using the appropriate mode in the established operating band.

Figure 3:
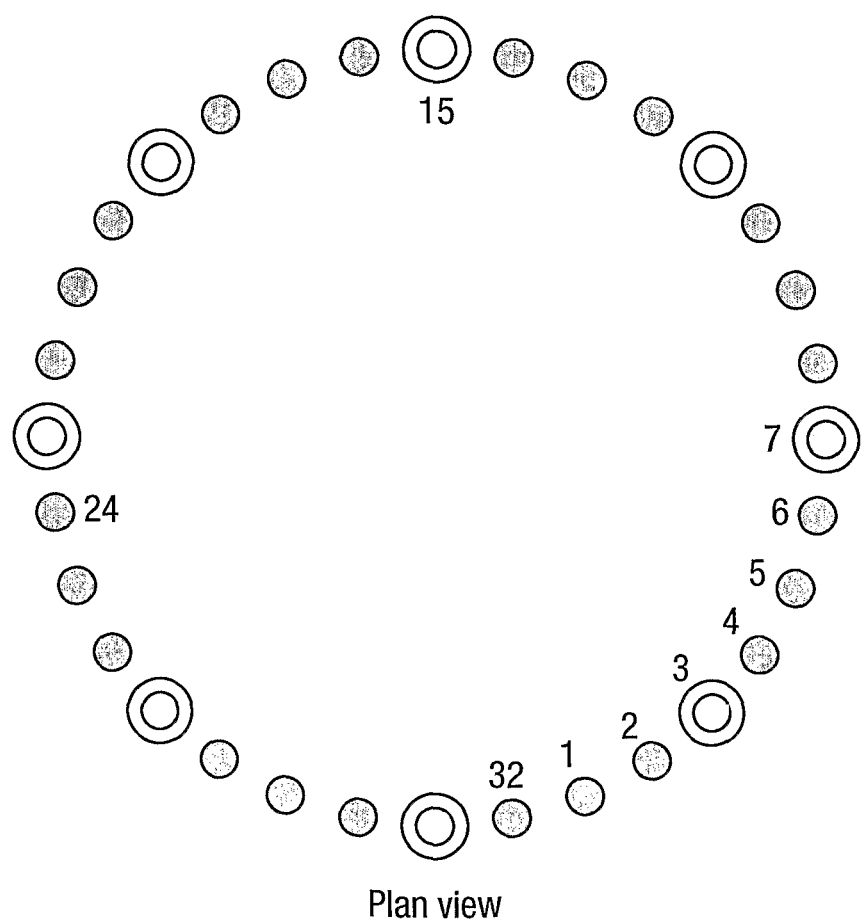
FIG. 3 illustrates eight hydrophones which are equally spaced around the perimeter of the receive array.

In order to determine the arrival angle of the HCM signal, HCM solutions are computed for each of eight hydrophones which are equally spaced around the perimeter of the receive array as shown in FIG. 3. The correlator outputs from adjacent elements are then thresholded and cross-correlated to determine the difference in signal arrival times. This process is described in greater detail in WO 04/027444, to which reference is directed. The signal arrival information is passed to a beamformer to allow a beam to be steered onto the transmitting platform.

Figure 4:
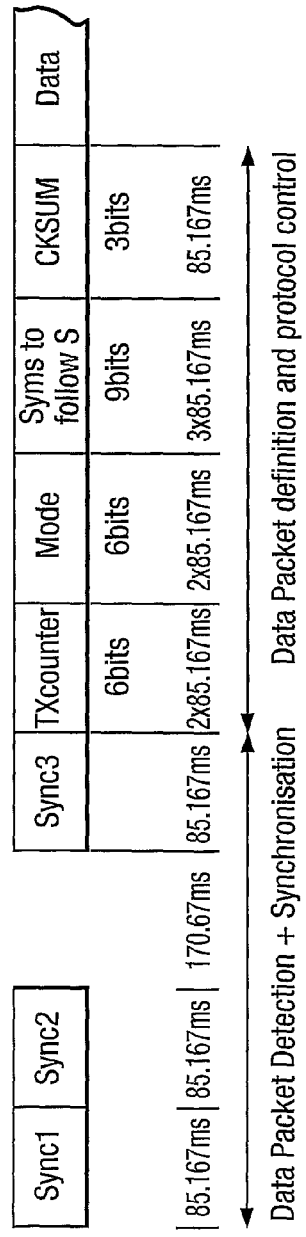
FIG. 4 shows an exemplary DCM protocol header.

Once the channel has been established, and relative bearing, relative Doppler and operating band have been determined, Data Communication Mode (DCM) can commence. The DCM protocol header common to all operating modes is illustrated in FIG. 4.

Figure 5:
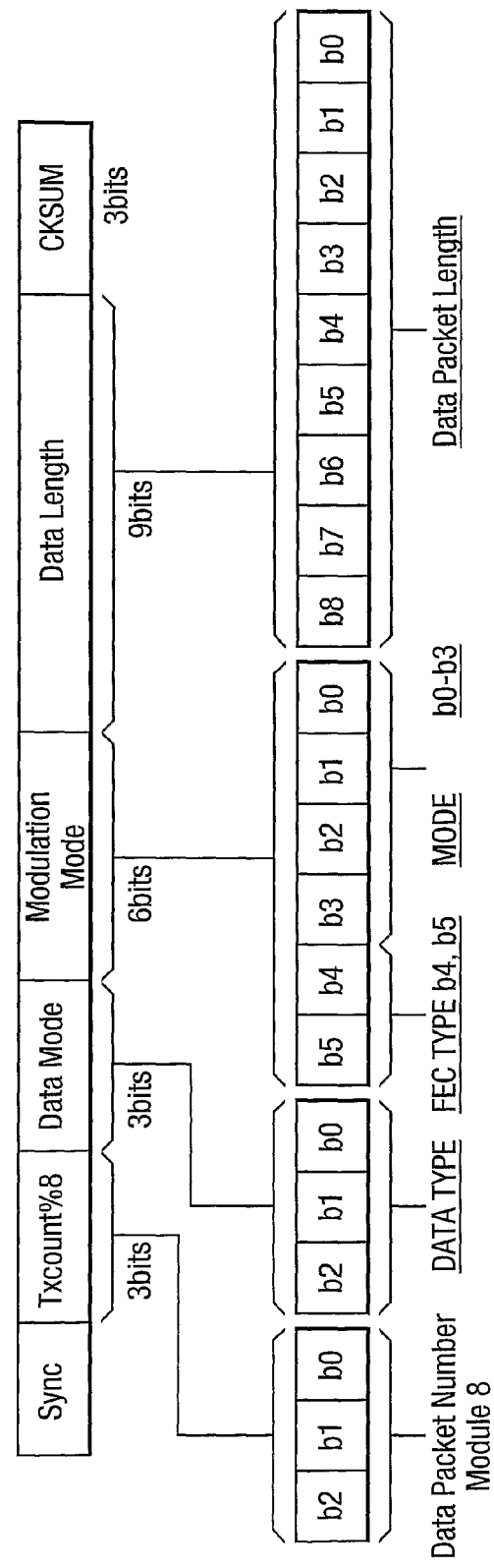
FIG. 5 shows the fields of FIG. 4 which define the properties of the subsequent data transmission.

The header comprises three synchronisation waveforms. The first two waveforms are used for time synchronisation and fine Doppler estimation, the third is used for channel estimation. Within the header there are several fields which define the properties of the subsequent data transmission. These fields are detailed in FIG. 5

Three bits are used to indicate up to eight posible data types such as ASCII data, binary data, SMS message and voice message for example. Four bits of the modulation mode indicate up to sixteen possible modes including low data rate and high data rate modes. A further two bits indicate FEC type. Finally, nine bits are used to indicate the data packet length, from 0 to 512 symbols/kB.

In addition to specifying the parameters of the data transmission the DCM protocol header includes a 3 bit checksum to identify header corruption.

Figure 6:
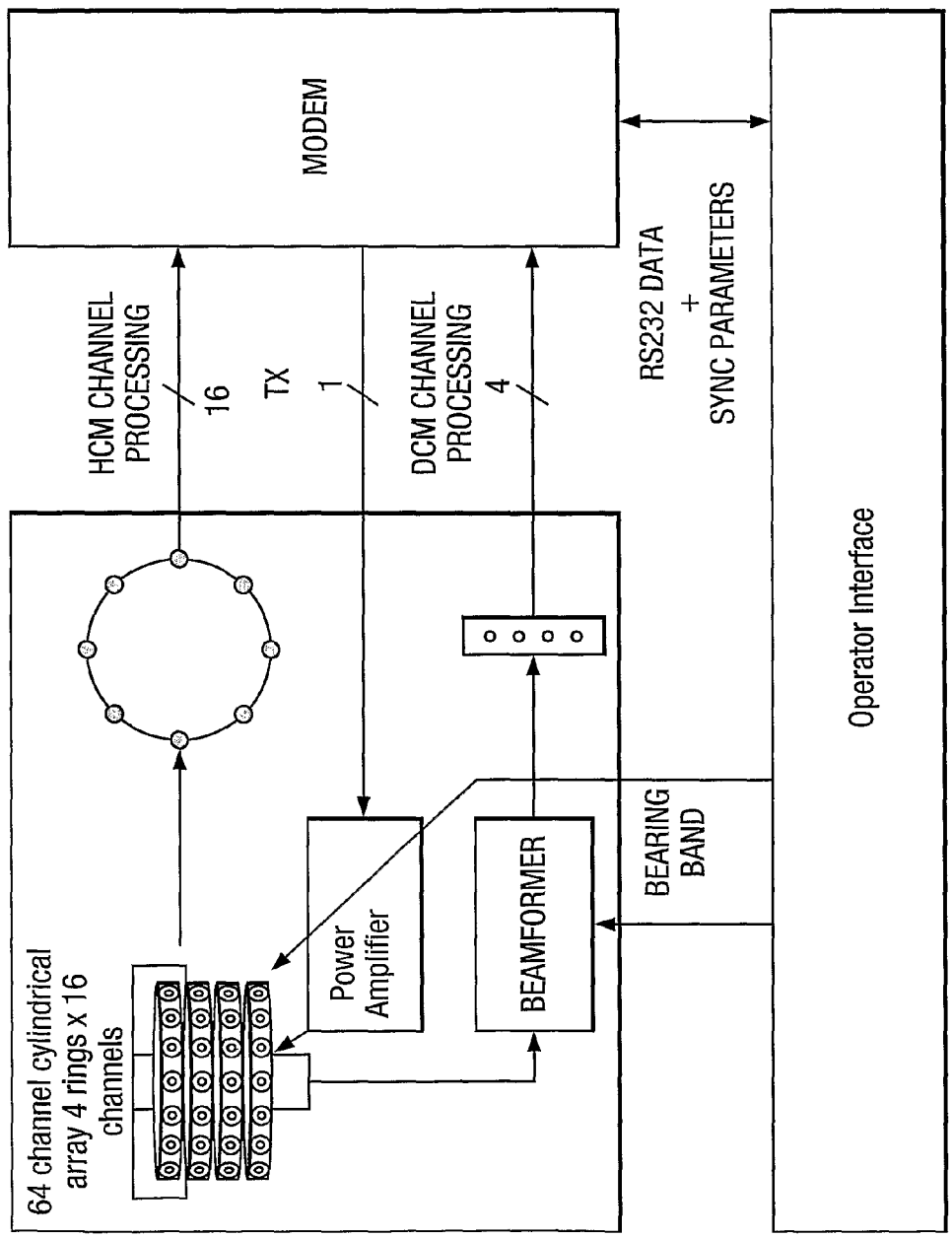
FIG. 6 illustrates the physical configuration embodying aspects of the invention.

FIG. 6 illustrates the hardware and physical interfaces of a modem capable of operation according to an embodiment of the invention.

There are four physical interfaces to the modem:
Handshake Communication Mode Interface (Modem Data Input)

The HCM data stream comprises single element data from the upper cylinder ring. This data stream provides full horizontal coverage and is used by the modem to detect, synchronise and localise remote handshake transmissions by other communicating parties.
Data Communication Mode Interface (Modem Data Input)

The DCM data stream comprises horizontal beam level data from each of the four rings conditioned from the bearing estimate obtained during the HCM mode. This processing exploits the full horizontal array gain for each ring and presents vertical channel data to the DCM processor.
Transmission Digital Data Stream (Modem Waveform Output)

The transmission digital data stream conveys digital transmission signals from the modem to L3-COM digital to analogue conversion and power amplification stages.
RS422 Serial Data Stream (User Data Input/Output)

The RS422 link conveys digital data information and detection parameters to and from the modem.

The modem employs two input processors. The first processor accepts channel data from a single ring. This processor is responsible for detecting HCM transmissions, measuring arrival Doppler and bearing, and determining protocol parameters which define operating band for data communication, transmission source level, source ID, destination ID. This information is forwarded to the user OMI via an RS232 to RS422 transceiver. This information is used to support sector mode data communications using the full array aperture. In a preferred embodiment, the HCM mode provides omnidirectional surveillance in the LF band only.

The primary function of the HCM processor is therefore to detect and decode HCM transmissions in order to precondition the modem for subsequent DCM transmissions. The HCM processor accepts ring level data from the array interface. This processor is responsible for system initial synchronisation and comprises several processing elements as shown in FIG. 7.

The signal processing chain in FIG. 7 depicts five main blocks. The Two chirp synchroniser block is responsible for detecting and synchronising to HCM transmissions. This block accepts quadrant element data from four ring elements. When a detection is made, time synchronised data is streamed to the Doppler synchroniser which implements a Doppler correction algorithm to remove temporal compression/expansion, as described in WO02/082695. Time-Doppler synchronised data is then streamed to the IQ down conversion block which down converts the signal to complex baseband. This complex baseband information is then streamed to the Channel bearing estimator. This algorithm calculates a fine bearing estimate by selecting the appropriate sector elements and using phase information between correlation outputs between elements. The Protocol Decoder block then decodes data information within the HCM transmission to provide the key outputs of the HCM processing:
Detection Information
Relative Bearing
Channel Impulse
SNR estimates
Relative Doppler
Data Payload Information
IFF Source ID
IFF Destination ID
Transmitter Source Level
Mode The second processor accepts horizontally beamformed data from the array for each of the four array rings. This processor is responsible for detecting data transmissions, decoding the DCM header protocol and implementing the appropriate signal basebanding chain commensurate with data modulation type and data rate. Complex baseband data from DSPB is forwarded to the demodulator processor DSPC. This mode provides sector coverage in either LF or MF bands.

The DCM processor accepts horizontal beam level data from the array interface. This data is valid after a valid HCM transmission is received. The HCM transmission establishes several second stage parameters for proper DCM operation.
Relative bearing
Relative Doppler
DCM operating band Once a valid HCM command is received and valid beamformed data becomes available on the input link port, the DCM processor implements a second stage synchronisation algorithm that operates on basebanded data as shown in FIG. 8

Referring to FIG. 8, beam level data from each of the four vertical rings is Doppler compensated based on the Doppler estimate provided by the HCM. This beam data is then basebanded according to the operating band specified in the HCM transmission and summed to form a single broadside beam.

The single vertical beam data I,Q data is then fed to an ambiguity synchroniser which implements a three channel complex correlator for three Doppler cells either side of the synchronised Doppler cell. The purpose of this synchroniser is to provide the system improved Doppler tolerance, particularly at HF and also to provide low-dynamic Doppler tracking where communicating parties are moving and relative Doppler changing.

In this way, Doppler changes of +/−0.75 m/s can be compensated without resort to re-estimation using a further HCM transmission.

Since both HCM and DCM processors operate concurrently, adjustments may be made to bearing, Doppler and operating band during data communications by transmitting additional HCM transmissions during the data communication phase and/or periodic transmission of HCM transmissions.

A third processor accepts time-Doppler-space synchronised complex baseband data from each of the arrays four rings and implements the appropriate demodulation scheme based on the decoded protocol information passed by DSPB. This protocol information defines the parameters discussed above, which are used automatically to decode and interpret the data transmission, including:

Operating band (HF or LF)
Modulation mode
Transmission counter
Transmission length
Current Bearing
Current Doppler
SNRw,SNRi,SNRo
Channel Estimate
Complex baseband data The exact details of the modulation schemes used are not central to the invention, however signal characteristics can be selected to exploit available bandwidth and provide varying levels of security/counter detection.

In the present example, modes in the LF band may have symbol times ranging from 20 to 170 ms, providing data rates of approximately 140 to 18 bps respectively. In the HF band, symbol times of 13 to 106 ms provide data rates of between 230 and 25 bps respectively.

Higher data rates can be provided by a different set of modulation modes, at the expense of robustness. LF high data rate modes can produce data rates up to 12000 bps and HF high data rate modes can provide data rates approaching 20000 bps.

It will be understood that the present invention has been described above purely by way of example, and modification of detail can be made within the scope of the invention.

Each feature disclosed in the description, and (where appropriate) the claims and drawings may be provided independently or in any appropriate combination.

The invention claimed is:

1. A method of communicating data acoustically between a link initiator and a link receptor, said method comprising the steps of:
    transmitting a link acquisition waveform via an array of acoustic transducers;
    receiving a receipt of the link acquisition waveform via the array of acoustic transducers;
    establishing, from the receipt, communication channel parameters for a communications channel between the link initiator and the link receptor, wherein the communication channel parameters include at least a Doppler parameter, and wherein the communication channel parameters are established by a processor; and
    transmitting data by the array via the communications channel according to the communication channel parameters.

2. The method according to claim 1, wherein the communication channel parameters further include at least one of a range parameter, a direction parameter, or a frequency band parameter.

3. The method according to claim 1, wherein the link acquisition waveform is transmitted omnidirectionally.

4. The method according to claim 1, wherein the array of acoustic transducers comprises an array of hydrophones.

5. The method according to claim 4, wherein the array of hydrophones is a ring array.

6. The method according to claim 1, wherein the channel parameters include a directional channel parameter based on a relative direction from the link initiator to the link receptor, and wherein data is communicated directionally according to the direction channel parameter by beamforming.

7. The method according to claim 1, wherein the link acquisition waveform defines a source level for the receipt.

8. The method according to claim 1, wherein the link acquisition waveform is less than 1 second in duration.

9. The method according to claim 1, wherein transmitting data via the communications channel comprises transmitting data packets in one of a plurality of data modes, wherein each data packet includes a header indicating the data mode for that data packet.

10. The method according to claim 9, wherein all data modes have a common header structure.

11. The method according to claim 9, wherein a data rate for the transmissions of data packets differs between modes.

12. The method according to claim 9, wherein the data packets are of variable length, and wherein each data packet includes a header indicating the length of the data packet.

13. An apparatus for transmitting data acoustically comprising:
    an array of acoustic transducers adapted to transmit a link acquisition waveform, receive a receipt of the link acquisition waveform, and transmit a data signal; and
    a processor configured to establish communication channel parameters based on the receipt, and to provide the data signal for transmission by the array according to the established communication channel parameters, wherein the channel parameters include a Doppler parameter.

14. An apparatus for receiving data acoustically comprising:
    an array of acoustic transducers adapted to receive a link acquisition waveform, send a receipt of the link acquisition waveform, and receive a data signal; and
    a processor configured to establish channel parameters based on the link acquisition waveform, and to process the data signal received by the array according to the established channel parameters, wherein the channel parameters include a Doppler parameter.

15. An apparatus for processing data to be communicated acoustically comprising:
    a handshake mode processor for processing a handshake transmission and establishing communication channel parameters, wherein the communication channel parameters include a Doppler effect parameter;
    a modulator for modulating data according to the established channel parameters; and
    a demodulator for demodulating data according to the established channel parameters.

* * * * *